March 7, 1961 J. J. WEIER 2,973,995
TRACTION DEVICES
Filed Jan. 8, 1959 2 Sheets-Sheet 1
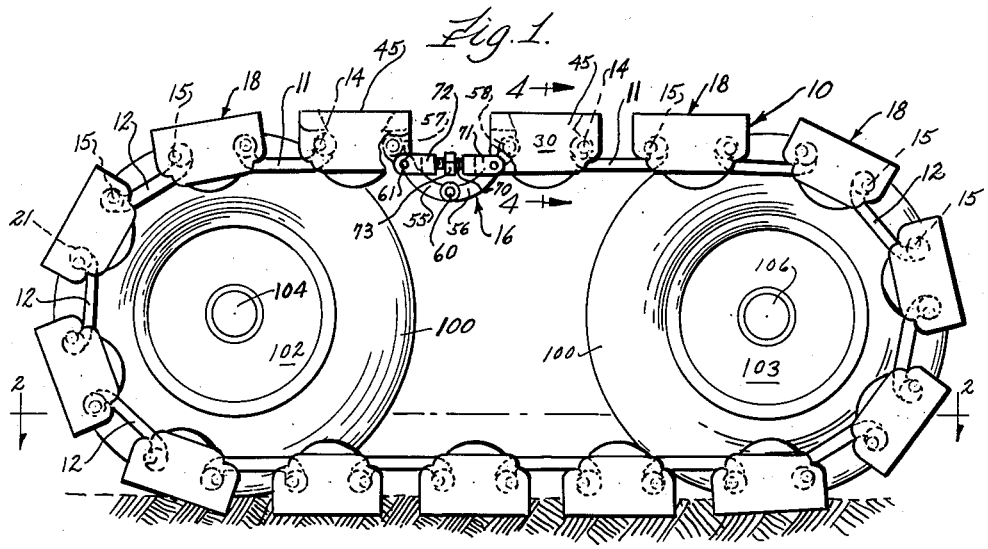

March 7, 1961
J. J. WEIER
2,973,995
TRACTION DEVICES
Filed Jan. 8, 1959
2 Sheets-Sheet 2
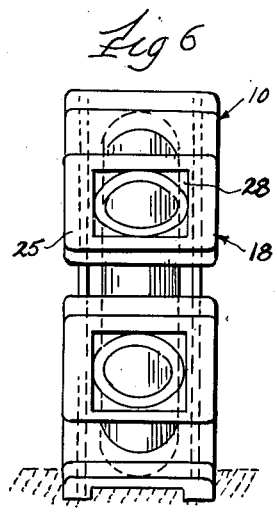
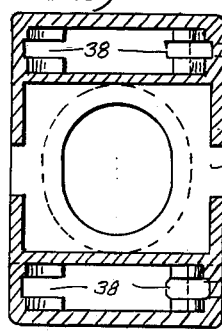
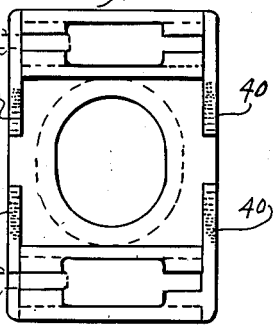
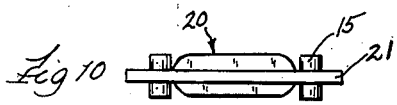
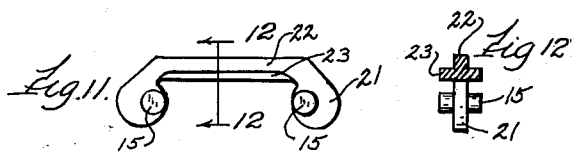
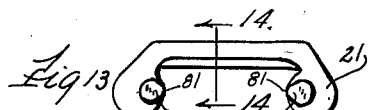
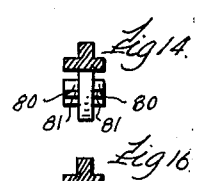
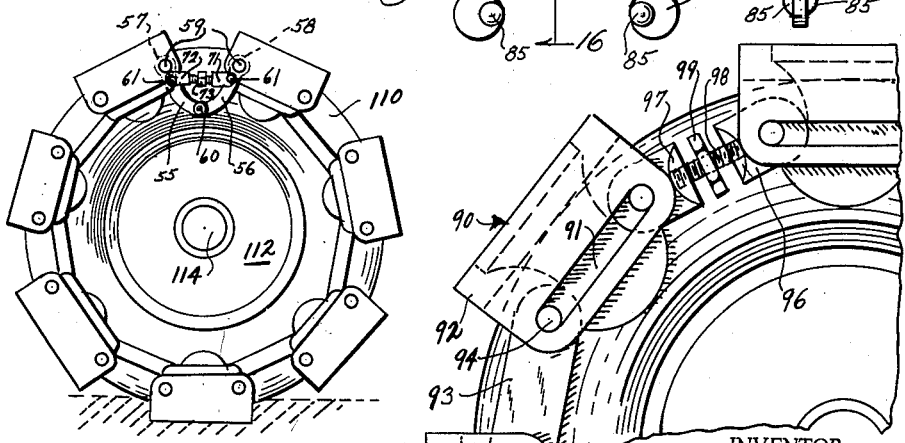
INVENTOR.
Jacob J. Weier.
BY
Joseph B. Lindecker.
Attorney.

United States Patent Office
2,973,995
Patented Mar. 7, 1961

2,973,995

TRACTION DEVICES

Jacob J. Weier, 10611 S. Sawyer Ave., Chicago, Ill.

Filed Jan. 8, 1959, Ser. No. 785,695

9 Claims. (Cl. 305—13)

This invention relates to traction devices and more particularly to endless traction elements for motor trucks.

The invention relates to a traction device for application to the individual wheel units of wheeled vehicles mounting a single resilient tire.

This invention relates to a new and improved endless traction chain with traction shoes, similar in function and design as described in applicant's issued Patent Number 2,859,067, issued November 4, 1958, and application, Serial Number 774,464, filed November 17, 1958, now Patent Number 2,950,148.

It has until recent years been considered that wheeled vehicles are limited to operation on relatively firm ground and that an entirely different type of vehicle must be provided for negotiating mud and sand and other soft surfaces, namely: conventional full track laying or semi-track laying vehicles. More recently, however, various proposals have been made for extending the scope of wheeled vehicles by increasing the flotation and adhesion of their wheels. Thus, it is the practice with heavy duty vehicles to use either very large size tires on single wheels or to use a unit consisting of two tires arranged side by side, and known as a dual wheel unit, to improve flotation, and it is common to apply so called chains intended to increase the adhesion between the wheels and the ground. It is generally recognized however, that in order to obtain satisfactory performance from a resilient tired driving wheel in soft, slippery and otherwise unfavorable conditions of terrain, it is necessary to mount on the tread of the tire a series of rigid radially spaced grouser bars, or rigid shoes, or plates, lying transversely across the line of travel and having the greatest area that may be tolerated. The rigid shoes, or rigid plates serve appreciably to increase the area of wheel element in contact with the ground.

The principal difficulty with the proposal heretofore made is that it had been found impossible under heavy traction conditions to stop the wheel from rotating within the traction device with consequent loss of traction and chafing of the tire, without either attaching the device rigidly to the wheel itself or else tightening it on the tire until full interference is obtained between each shoe and the tire profile. The former arrangement necessitates modifications or additions to the wheel structure, which is undesirable, while the latter has proven to be a matter of great mechanical difficulty.

It is obvious that any device which will appreciably improve the traction and flotation characteristics of a wheel in soft ground must be designed with shape and size which will render its employment desirable and useful, without undue weight. The device must be of a kind without difficulty to install on the individual wheel units, must be easy to remove and of novel construction so as to be collapsed into a small space to facilitate convenient storage. The term "individual wheel units" as used herein include both the so-called "single wheel" which is referred to as a single-tired wheel, alone or arranged one behind the other in tandem.

One object of this invention is to provide a traction belt or chain, forming an endless track, type traction device where hook shaped bars or links are connected between the traction shoes which permit the bars or links to move up and/or down vertically, or laterally to a small degree, in the manner of the universal joint independently without displacement of the traction shoes from the tires, or rotation of the tire within the traction shoe, and a device wherein the harness mechanism is so formed to keep mud from collecting between the movable parts and adapted to be collapsed into a small space to facilitate convenient storage.

A more specific object of the invention is to provide a device of the kind described which is mounted on the wheel unit and is easily tightened to the desired extent, and maintained in the tightened condition, the device being durable and a strong track-shoe with suitable openings therein to prevent the accumulation of mud, or the like, therein; affording a track-shoe superior to those now in use.

Still another object of this invention is to provide a traction chain, with track-shoes, which is relatively inexpensive and is well adapted to quantity production.

And still another object of this invention is to provide a chain with a plurality of track-shoes and intermediate links of identical structure and two novel connecting links which are constructed to vary in length and effect the desired tension of the chain; said links to hold the chain in the desired tightened condition.

A further specific feature of this invention is to provide two strong and adjustable connecting links which are easily applied to the traction chain, one link on each side of the vehicle tire; but they will not be detached by blows from exterior objects, or by shocks and jars incident to the travel of the wheels over rough roads and the like.

These and further objects of my invention will be set forth in the following specification, reference being had to the accompanying drawings, and the novel means by which said objects are effectuated will be definitely pointed out in the claims.

In the drawings:

Figure 1 is an elevation, partially in section, of two single-tired wheels arranged in tandem, each wheel having a tire thereon of suitable tread, a traction chain with shoes and links spaced and disposed around the tread, and showing one of the adjustable connector links assembled to the terminal traction shoes of the traction chain;

Figure 2 is a fragmentary sectional view taken along the line 2—2 of Figure 1;

Figure 3 is a top plan view of one of the traction chains embodying track-shoes, links and two connector links as shown by Figure 1;

Figure 4 is a sectional view of a track-shoe taken along the line 4—4 of Figure 1;

Figure 5 is a sectional view of a track-shoe taken along the line 5—5 of Figure 4;

Figure 6 is an end elevational view of the traction chain applied to a single wheel unit in tandem, as shown by Figure 1;

Figure 7 is an elevational view, of a single-tired wheel illustrating the spacing and disposition of the traction chain, with track shoes, rigid links and two connector links around the tread of the tire.

Figure 8 is a sectional view of a track-shoe taken along line 8—8 of Figure 5, a rigid link shown dotted and connected therewith;

Figure 9 is a bottom plan view of the track-shoe of this invention, a rigid link is shown dotted and connected therewith;

Figure 10 is a top plan view of a rigid link embodied in this invention;

Figure 11 is a side elevation of the link shown by Figure 10;

Figure 12 is a sectional view of a link taken along the line 12—12 of Figure 11;

Figure 13 is a side elevation of modified link forming a part of this invention;

Figure 14 is a sectional view of the link taken along line 14—14 of Figure 13;

Figure 15 is a side elevation of a further modified link forming a part of this invention;

Figure 16 is a sectional view of the link taken along line 16—16 of Figure 15; and Figure 17 is an enlarged, fragmentary view of a single-tired wheel, with a modified track-shoe, a modified straight link, and a modified straight rotatable connecting link, all forming a part of this invention.

My traction device includes an endless chain 10 having a plurality of terminal links 11, intermediate links 12, terminal pins 14 carried by the terminal end of terminal links 11, pins 15 carried by said intermediate links 12, two adjustable connector links 16, and perforated shoes 18 connected with and arranged between adjacent ends of said terminal and intermediate links; said pins 15 also carried on the terminal links on the ends opposite said terminal ends.

The links are in the nature of C-shaped members with central body portion 20 whose ends terminate in the enlarged curved or rounded heads 21, said heads 21 provided with trunnions, or terminal pins 15 extending from the opposite side thereof. The central body portion 20 is formed with a vertical top portion 22 and with a lower horizontal flange portion 23 extending outwardly from each side thereof, said flange 23 giving added strength and becoming a reinforcing flange for said C-shaped members. The cross-section of said central body portion 20 effecting an inverted T-shaped member.

The track-shoes 18 have a horizontal upper or outer surface 25 of substantially rectangular configuration formed with an oval-shaped central passageway 26 extending therethrough from the lower inside surface 27 to a rectangular shaped opening 28 in the outer, or upper surface 25. Each track-shoe has outer depending side walls 29 and 30, clearly shown by Fig. 4. The shoes have vertical, inner walls 31 and 32, the upper portions thereof arranged parallel with and spaced inwardly from said walls 29 and 30; the lower edge portion 33 of said side walls 31 and 32 being semi-circular in configuration. The walls 29 and 30 have boss portions 34 and 35 formed upon the vertical inner surfaces thereof and protruding toward walls 31 and 32. The vertical walls 31 and 32 have boss portions 36 and 37 formed on the vertical outer walls and protruding toward walls 29 and 30. Each pair of boss portions 34, 35, and 36, 37 are separated by a vertical opening, as shown at 38 in Figure 4, to an extent sufficient to receive freely the upwardly protruding top portions 22 of the links 11, and 12. The boss portions 34, 35, 36, and 37 are cut away or socketed, as shown at 39 in Figures 4 and 5, to an extent sufficient to receive the trunnions, or pins 14 and 15. Said sockets 39 provide horizontal slots closed at their outer ends and open at their inner ends. Said trunnions 14 and 15 are adapted to rotatably seat in said sockets 39. The intermediate, central body portion 20 of the links is of a length which will maintain the required spacing between adjacent track-shoes when said trunnions are seated in their respective sockets 29 in said boss portions of the vertical walls of the shoes, as shown dotted by Figures 8 and 9. In order to provide sufficient strength and rigidity, I have shown by Figures 10 through 16, the links 11 and 12 with the reinforcing rib 23 disposed outwardly throughout their lengths between the trunnions. Referring to Figures 4 and 9, each shoe is formed with depending transverse vertical wall portions 40 extending between walls 31 and 32 and terminating short of the center area thereof. Said wall portions 40 are integrally formed with said wall portions 31 and 32, extending from a central portion of each vertical wall 31 and 32 to a central part of the inner surface 27 of the shoes; the terminal edges of said wall portions 40 being arc shape and each pair between the vertical walls forming a substantially semi-circular wall with a central opening, and adapted to extend across the profile of the tire; the tire fitting between said side walls 31 and 32 whereby said wall portions 40 become embedded in the resilient tire tread when weight is applied to the single-tired wheels. These wall portions 40 have made it possible under heavy traction conditions, to stop the tire from rotating within the shoe with consequent loss of traction and chafing of the tire. The openings between the various walls of the shoes, and the oval-shaped openings in the outer surface of each shoe, reduces the weight of the customary solid shoe and provides a sufficient opening for the tire used therein to extend substantially therethrough preventing the accumulation of mud and grit within the shoe. The mud is actually ejected from the shoe while the chain is in motion.

When the links are assembled with a shoe, the major portion of the head 21 with trunnion, or pins 15, is inserted into the hollow space 38 between the bosses 34, 35, 36 and 37 and drawn longitudinally towards the closed ends of the sockets 39 for pivoting and locking the pins 15 therein, said pins 15 being actually journalled therein and allowing the curved head portion 21 of the links to oscillate through the opening 38 as the chain passes around a tire on a single-tired wheel. The intermediate links 12 and the shoes 18 are connected together to form the chain; an end portion of each adjacent link is assembled within the hollow 38 of each shoe. The terminal links 11 have terminal pins 14 pivotally and removably secured within one end of a terminal shoe 45. The terminal shoes 45 are jointed together by the two adjustable connector links 16, shown by Figures 1 and 3, to form an endless chain 10.

Each of the adjustable connectors 16 referred to above is formed of a plurality of parts, two cooperating jaws 55 and 56, each formed at their free ends with curved head portions 57 and 58, respectively, with pins 59 arranged and assembled therewith and passing therethrough, forming stub portions extending outwardly from each side thereof. As shown by Fig. 1, the jaw 55 is provided with a bifurcated shank portion having spaced parallel legs, and the jaw 56 is provided with a solid shank portion with a substantially straight end portion substantially of the same thickness as compared to the space between the legs on jaw 55, thus arranging for the assembly of said substantially straight end portion between said legs. The legs and end portions are apertured to receive a pivot pin 60 assembled transversely thereof, thus providing for swinging movement of the jaws 55 and 56 about this point. Adjacent the curved head portions 57 and 58 of the jaws 55 and 56 are provided ears extending inwardly and towards each other when the jaws 55 and 56 are assembled together. Each ear is provided wtih a transverse perforation to receive a pin 61. An adjusting bolt 70 is assembled between said ears on jaws 55 and 56, said bolt comprising end portions 71 and 72 with an intermediate screw portion 73. The ends 71 and 72 are substantially tubular with bifurcated ends. The tubular end portions provided with interior wall portions having left and right-hand threads, respectively. The adjusting screw 73 has threaded end portions with adjusting head therebetween by which it may be manually manipulated. It will be obvious that with this construction the head portions 57 and 58 are pivotally connected together through the adjusting bolt 70, the shank portions of the jaws rocking upon the pin 60. Thus the free ends of the jaws 55 and 56 with pins 59 can be drawn closer together or extended outwardly by manipulation of the adjusting head of said screw 73. The pivot pins 60 and 61 connecting the jaws 55 and 56 and the bolt 70 together in a common plane and allowing free pivoting and movements of said parts as the adjusting head of screw 73 is manipulated. More specific details of the connecting link 16 is given in my co-pending patent application, Serial No. 774,464.

I have described my invention using links as shown specifically by Figures 10, 11 and 12. I wish to embody in this invention that the pins 15 as described may be changed in configuration from cylindrical to pins 80 of conical cross-section as shown by Figures 13 and 14. The tapered inner transverse contacting edge portion 81 of said pins 80 will fit in the sockets 39 and form a knife-type bearing surface for pivoting against the closed end wall of the sockets. Further, should it be more desirable to substitute ball-type trunnions, as shown by Figures 15 and 16, the sockets in the shoes may be modified to receive trunnions 85 as shown, a steel ball of spherical configuration secured within the rounded heads 21.

My invention may embody a modified type of track-shoe and straight link with a modified connecting link as shown by Figure 17. The shoes 90 have a slotted portion 91 extending longitudinally in the outer walls 92. The links 93 have a body portion of rectangular cross-section with cylindrical pins 94 extending outwardly from each side of the semi-circular end portions 95 of links 93. The pins 93 are carried by and fulcrumed within the slotted portion 91 in the side walls of the shoes 90. The adjustable connecting link 96 consists of two end plate-like end members with flanged portions 97 arranged therewith, each flanged portion having a central bore with threads therein. An adjusting screw 98 is provided with threaded end portions with adjusting head 99 therebetween by which it may be manually manipulated. The threads in said flange portions 97 are left and right-hand threads to correspond with the left and right-hand threads of said screw 98, whereby the parts may be adjusted by manipulation of said adjusting head 99. The construction shown by Figure 17 is a simplified and cheaper type construction and will prove satisfactory in most applications.

It will be apparent with the various type constructed units, the chain can be easily applied and tensioned upon the outer surface of the tires on single-tired wheels, arranged alone at each end of an axle as shown by Figure 7, or upon single-tired wheels arranged in tandem as shown by Figures 1, 2 and 3. By Figures 1, 2 and 3 the tires 100 are arranged upon wheels 102 and 103 assembled on axles 104 and 106. By Figure 7, the tire 110 is arranged upon wheel 112 which is assembled upon axle 114.

The traction device in the preferred type therefore includes an endless chain 10 having links 11 and 12 connected with shoes 18 and terminal shoes 45, the terminal shoes connected together by two adjustable connectors 16 to form an endless chain, the chain adjusted and/or tensioned by manipulation of the head on each adjusting screw 73. The shoes extend transversely of the tires as shown by Figures 2, 3 and 6. The links 11 and 12 and connecting links 16 are disposed on each side of the single tire on the wheels, clearly shown by Figure 3.

In applying the chain 10 to tires upon wheels assembled in tandem, the links are connected to the shoes forming a chain. The chain is applied to the tires, or arranged on the ground, the vehicle using the chain is moved upon the chain arranged on the ground, the terminal shoes are then raised and arranged close to each other, and then the adjustable connector links 16 are assembled therewith on each side of the wheels as described above; the heads of the adjusting screws are then manipulated to draw adjacent sides of the terminal shoes toward each other, making an endless chain free from any dangerous amount of slack. If after the connector link 16 is applied and the vehicle driven, slack should appear in the chain, the adjusting screws 73 can be manipulated again, thereby removing the slack. When the connector links 16 are properly applied, exterior pressure on the chain 10 causes the terminal pins to be held more securely within the connecting chain parts.

My chain is absolutely fool-proof; it cannot be unfastened by striking any exterior object because the connector links 16 are assembled on opposite sides of the tires and protected by the resilient side walls of the tires juxtaposed thereto, and the strain on the shoes is absorbed by the transverse ribs 40 formed therewith, which embed themselves in the tread of the tires, preventing the wheels from rotating within the shoes with loss of traction and chafing of the tires.

My modified units shown by Figures 13 through 17, and the arrangement shown by Figure 7 can be used without departure from my invention.

When it is desired to disengage the chain from the tires on the wheels, the two connector links 16 are manipulated to allow the jaws to spread farther apart, allowing the pins therewith to be removed from the terminal shoes and in this manner the chain can be quickly released.

A considerable advantage of this novel chain with two jaw-type adjusting connectors assembled on opposite sides of the tire as illustrated, is that it may be folded into a stowing position occupying little space.

It will be understood that modifications and variations may be effected without departing from the scope of the novel concepts of the present invention.

What I claim is:

1. In a traction device having a pair of single vehicle wheels arranged in tandem, the combination, of a pair of single wheels arranged in tandem and having tires assembled thereon, said tires on said pair of single wheels arranged in tandem having adjacent semicircular surface portions and opposite semicircular surface portions, a chain for arrangement around the opposite semicircular surface portions of the pair of single tires and spanning between said single tires on the pair of single wheels in tandem, said chain having a pair of rectangular shaped terminal shoes and a plurality of rectangular intermediate shoes joined together by a plurality of terminal and intermediate links and a pair of adjustable connector links thereby forming an endless chain, each of said shoes embodying a body portion formed with a plurality of opposed slotted portions, said intermediate shoes joined together by said intermediate links and thereby forming the central portion of said chain, one of said terminal shoes arranged at each end of said central portion of said chain and each joined thereto by one of said terminal links, said terminal links having outer terminal ends and inner opposite ends, said pair of terminal shoes joined together by said pair of adjustable connector links, said terminal links carrying terminal pins on the outer terminal ends thereof and trunnion pins on the inner opposite ends thereof, said intermediate links carrying trunnion pins on each of their opposite ends, said intermediate shoes receiving in their slotted portions the trunnion pins on adjacent ends of said intermediate links and on said terminal links, said terminal shoes receiving in their slotted portions adjacent said intermediate shoes the terminal pins of said terminal links, said terminal shoes receiving in their remaining slotted portions the terminal pins formed on said adjustable connector links to assemble said elements of said endless chain in operable relation, a pair of arc-shaped side walls carried by each of said shoes and disposed transversely thereof for arrangement with the side walls of said tires on said wheels, and manually operable means for manipulating said pair of adjustable connector links in adjusted position.

2. The tandem device as claimed in claim 1 in which said terminal and intermediate shoes and said pair of arc-shaped side walls therewith embodying an aperture, said aperture extending vertically through the body portion of the terminal and intermediate shoes, and the tread of the tires on the wheels adapted to project partially through said aperture whereby mud and the like is prevented from accumulation, and the tread of the tires resting upon said pair of arc-shaped side walls thereby preventing rotation of the tire within the shoe.

3. The tractor device as claimed in claim 1, in which the terminal and intermediate links are C-shaped and each embody a central portion of inverted T-shape in cross section.

4. The traction device as claimed in claim 3 in which the pair of adjustable connector links are formed with enlarged curved head portions at each end thereof with terminal pins extending transversely therethrough.

5. The traction device as claimed in claim 1 in which each of the adjustable connector links consists of two movable jaws having one end of each pivoted together, said terminal pins arranged in the opposite ends thereof, and an adjustable bolt pivotally assembled between said jaws and adjacent said terminal pins thereof and said intermediate links between said shoes embodying a central portion of inverted T-shape in cross section.

6. In a traction device for single vehicle wheels arranged in tandem, the combination of wheels arranged in tandem having single pneumatic tires, an endless chain having a plurality of terminal and intermediate links with free end portions, a plurality of terminal and intermediate shoes, and a pair of adjustable connector links, said intermediate links to be arranged between said intermediate shoes, each terminal link to be arranged between a terminal shoe and an adjacent intermediate shoe, said pair of adjustable connector links formed of a plurality of parts to be arranged between the terminal shoes, said shoes and links arranged to have portions thereof to function on the single tire on each of the single vehicle wheels, terminal pins carried by the free end portions of each of said links, said terminal and intermediate shoes formed with a hollow central body portion, said central body portion formed with socketed wall portions and arranged between said terminal and adjacent intermediate links and between said intermediate links, said body portions receiving in their socketed wall portions the pins of the adjacent ends of said terminal and intermediate links to secure said terminal and intermediate links in operative relation, transverse arc-shaped side walls carried by said terminal and intermediate shoes and disposed transversely thereof for arrangement transversely upon the single tire of each of said single vehicle wheels, and manually operable means embodied with each of said connector links for manipulating said parts of said connector links to various desired positions.

7. The traction device as claimed by claim 6 in which said means for manipulating each of said pair of connector links consists of a bolt having a screw with right and left handed threaded end portions adapted to function in tubular end portions of the bolt provided with complementally threaded interior walls, said screw having a nut intermediate its ends by which it can be manipulated.

8. The traction device as claimed by claim 6 in which each of said adjustable connector links comprises a pair of arcuate shaped jaws with concave portions adjacent each other in a common plane, one end of each of said jaws perforated and pivoted together, said terminal pin carried on the opposite ends thereof, ears formed on each jaw adjacent the free ends thereof, said manually operable means consisting of a bolt arranged between said ears, said bolt consisting of tubular end portions with a screw interposed therebetween, said tubular portions provided with interior walls having right and left-handed threads therewith, said walls adapted to receive the complementally threaded end portions of said screw.

9. The traction device as claimed by claim 8 wherein said screw is provided with a nut intermediate its ends by which it can be manipulated, and each of the traction shoes embodying a pair of arc-shaped side walls on the interior thereof whereby the tread of the tire upon which the chain is assembled rests thereon and thereby preventing slippage of said tire within said shoe.

References Cited in the file of this patent
UNITED STATES PATENTS

| | | |
|---|---|---|
| 1,423,202 | Fellows | July 18, 1922 |
| 1,460,657 | Kintz | July 3, 1923 |
| 2,171,547 | Galanot et al. | Sept. 5, 1939 |
| 2,432,329 | Marthinsen | Dec. 9, 1947 |
| 2,859,067 | Weir | Nov. 4, 1958 |